United States Patent Office 3,377,386
Patented Apr. 9, 1968

3,377,386
MANUFACTURE OF PHENOLIC COMPOUNDS
Harry Chafetz, Poughkeepsie, N.Y., assignor to Texaco Inc., New York, N.Y., a corporation of Delaware
No Drawing. Filed Dec. 10, 1964, Ser. No. 417,492
8 Claims. (Cl. 260—621)

This invention relates to a novel method of manufacturing phenolic compounds. More particularly, it pertains to the catalytic manufacture of monohydroxyaromatic hydrocarbons via the reaction of the aromatic hydrocarbon with a peroxide in the presence of a Lewis acid catalyst.

In the past, phenolic compounds have been produced by many different methods. For example, phenol was prepared by reacting sodium benzene sulfonate with sodium hydroxide followed by acidification and by chlorinating benzene to form a monochlorobenzene and then reacting the chloro product with sodium hydroxide followed by acidification. A third method of forming a phenol was by reacting cumene with air to form cumene hydroperoxide and passing the hydroperoxide into a bath of sulfuric acid or phosphoric acid to generate the phenol. Still another prior art method calls for the reaction of benzene with air in the presence of a hydrogen fluoride, silver oxide, or ferrous oxide catalyst. In respect to alkylated phenols these are often prepared in the prior art by directly alkylating phenol.

I have discovered, and this constitutes my invention, still another way of producing phenol, alkylated phenols and monohydroxy polycyclic aromatics. One advantage of my novel procedure is that it can produce the desired phenol in a single step without resorting to the multiple steps of hydrolysis, chlorination and alkylation necessary to produce the desired phenols in the prior art procedures.

Specifically, the method of the invention comprises the reaction of an aromatic hydrocarbon of the formula:

ArH where Ar is a hydrocarbyl radical of from 6 to 40 carbons selected from the group consisting of aryl and alkaryl, with a peroxide compound selected from the group consisting of hydrogen peroxide and an organic peroxide of the formula:

ROOR' and ROOH where R and R' are the same or different alkyl radicals of from 1 to 20 carbons in the presence of a Lewis acid catalyst selected from the group consisting of aluminum trichloride, aluminum tribromide, antimony pentachloride, and ferric chloride. A preferred catalyst is aluminum trichloride.

Under advantageous conditions the reaction is conducted at a temperature between about −50 and 50° C., preferably between −10 and 10° C. Further, the molar ratio of aromatic compound to peroxide or hydroperoxide is desirably between about 100:1 and 1:5, preferably between about 2:1 and 3:1. When hydrogen peroxide is the peroxide reactant, it is normally present as a 10 to 100 wt. percent aqueous solution, preferably between about 30 and 100 wt. percent. Although any amount of Lewis acid catalyst would provide sufficient catalyzation to form some phenolic compound, the Lewis acid catalyst is normally present in the reaction mixture in a molar ratio of Lewis acid catalyst to peroxide or hydroperoxide of between about 10:1 and 0.1:1, preferably between about 2:1 and 0.5:1. The reaction is normally conducted for a period of from 0.1 to 24 hours, more advantageously, for a period of from 0.5 to 4 hours. The phenolic products of the method of the invention are isolated and purified from the reaction mixture by standard means. For example, by acidification, extraction, fractional distillation, washing, drying and combinations thereof.

The overall reaction and the theorized mechanism thereof is further described by the following chemical equations utilizing benzene, hydrogen peroxide and aluminum trichloride as the reactants and catalyst:

(a) Overall reaction:

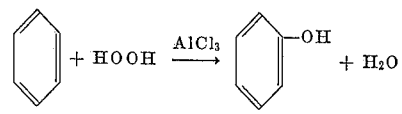

(b) Theorized reaction mechanism:

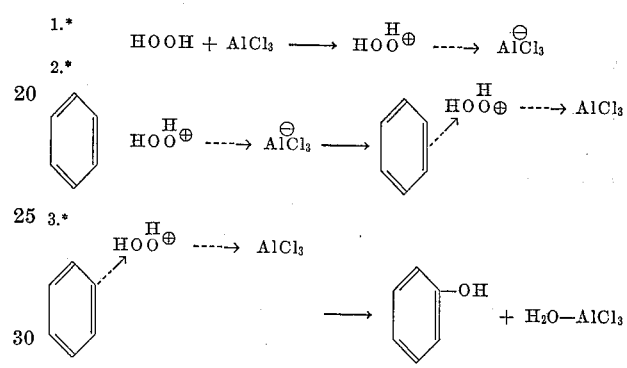

*→Denotes chemical complex relationship.

Examples of the aromatic hydrocarbons contemplated herein are benzene, toluene, ethylbenzene, dodecylbenzene, xylene, 1,3,5-trimethylbenzene, cumene, 1,4-di-n-propylbenzene, naphthalene, anthracene, 1,2,3,4,5-pentamethylbenzene, 1-octylanthracene and 1,4-di-n-heptadecylbenzene.

Specific examples of the peroxides contemplated herein are a 30 wt. percent aqueous solution of hydrogen peroxide, and primary, secondary and tertiary alkyl peroxides and hydroperoxides such as di-t-butyl peroxide, diethyl peroxide, didecyl peroxide, diisopropyl peroxide, isopropyl hydroperoxide, ethyl hydroperoxide and octadecyl hydroperoxide.

Since the reaction is desirably conducted in a liquid medium in order to facilitate contact between the reactants and catalyst, inert liquid diluent may be employed, particularly when neither of the reactants are liquids. Examples of such inert medium are nitromethane, nitrobenzene, carbon disulfide and tetrahydrothiophene-1,1-dioxide.

The following examples further illustrate the invention:

EXAMPLE I

To a mixture of 312 grams of benzene and 67 grams of aluminum trichloride were added with stirring, 16 grams of 30 wt. percent aqueous hydrogen peroxide over a period of 15 minutes while keeping the temperature at 5–10° C. with an ice bath. The resulting dark blue product was stirred for an additional 6 hours at 3–10° C. and 1 hour at 10–24° C. and then mixed with 200 mls. of water and 50 mls. of 6 N sulfuric acid. The aqueous layer was separated and extracted once with 500 mls. of ether and twice with 300 mls. portions of ether. The combined organic layers were dried over 60 grams of anhydrous sodium sulfate and then stripped to a pot temperature of 100° C. to leave 17 grams of residue. Analysis of the residue showed it to contain 6.4 grams of phenol (47% of theory).

EXAMPLE II

A 30 wt. percent aqueous solution of hydrogen peroxide in water (20 grams) was added with stirring to a mixture of 150 grams of mesitylene and 33.5 grams of aluminum trichloride over a time period of 2 hours while keeping the reaction temperature at 0.5° C. The resulting red-orange mixture was stirred for another hour at 5° C. Enough concentrated hydrochloric acid was added to clarify the mixture, which was then extracted three times with 300 mls. portions of ether. The combined ether extracts were dried over 30 grams of anhydrous sodium sulfate and then stripped to a pot temperature of 130° C. to leave 148 grams of residue. Gas chromatographic analysis of the residue showed it to contain 10.2 grams of 2,4,6-trimethylphenol (42.4% of theory).

EXAMPLE III

To a mixture of 300 grams of o-xylene and 67 grams of aluminum trichloride were added with stirring 40 grams of 30 wt. percent hydrogen peroxide solution in water over a period of two hours while keeping the reaction temperature at 0–5° C. The dark red-orange mixture was stirred for an additional hour at 5° C. and one more hour at 5–24° C. and then poured over 300 grams of ice. The resulting mixture was washed into a separatory funnel with 100 mls. of benzene and extracted twice with 200 mls. portions of benzene. The combined organic extracts were washed three times with 100 mls. portions of 5 wt. percent aqueous sodium hydroxide solution and once with 100 mls. of water. The combined aqueous washes were acidified to a pH of 3 with concentrated hydrochloric acid and then extracted with three 200 mls. portions of benzene. The combined organic extracts were dried over anhydrous sodium sulfate and then stripped to a pot temperature of 125° C. to leave 14.6 grams of residue. Analysis of the residue by gas chromatography showed it to contain a mixture of monohydroxy-1,2-dimethylbenzenes.

EXAMPLE IV

To a mixture of 23 grams of aluminum trichloride and 135 grams of benzene were added dropwise a solution of 25 grams of di-t-butylperoxide in 100 grams of benzene over a period of 4 hours while keeping the temperature at 3–10° C. (ice bath). The resulting mixture was stirred for an additional 45 minutes after removal of the cooling bath and then poured over 475 grams of ice. The reaction flask was further washed with 500 mls. of water. All products were combined and the organic layer was separated. The combined aqueous layers were extracted with 300 mls. of ether (discarded) and then acidified with 6 N hydrochloric acid to a pH of 3. The resulting mixture was extracted three times with 300 mls. portions of ether. The combined ether extracts were dried over 40 grams of anhydrous sodium sulfate and then filtered and stripped to a pot temperature of 70° C. to leave 4.2 grams of residue. Analysis of this residue by gas chromatography showed it to contain 0.92 gram of phenol.

EXAMPLE V

To a mixture of 350 grams of benzene and 70 grams of aluminum trichloride was added dropwise with stirring a solution of 50 grams of t-butylhydroperoxide in 118 grams of benzene over a period of 2.5 hours while keeping the temperature between 3–9° C. with an ice bath. The resulting mixture was stirred for an additional 2.5 hours at 3–6° C. and then poured over ice to a total volume of 1200 mls. The layers were separated and the aqueous layer was extracted four times with 300 mls. portions of ether. The organic layers were combined, dried over 50 grams of anhydrous magnesium sulfate and then stripped to a pot temperature of 105° C. to leave 26 grams of residue. Gas chromatographic analysis of the residue showed it to contain 2.2 grams of phenol.

EXAMPLE VI

To a mixture of 200 grams of mesitylene and 23 grams of aluminum trichloride were added with stirring 25 grams of di-t-butylperoxide over a period of two hours while keeping the temperature at 0–6° C. The resulting dark reddish brown mixture was stirred for an additional hour at 5° C., then allowed to warm to room temperature with continued stirring (1 hr.) and then mixed with 400 grams of ice. The mixture was clarified with concentrated hydrochloric acid and then extracted four times with 200 mls. portions of ether. The combined organic layers were dried over 40 grams of anhydrous sodium sulfate and then stripped to a pot temperature of 100° C. to leave 204 grams of residue. The residue was found by gas chromatographic analysis to contain at least 6.7 grams of 2,4,6-trimethylphenol. This was a yield of 2,4,6-trimethylphenol equal to 25.5% of theory based on the di-t-butylperoxide charged.

EXAMPLE VII

To a mixture of 100 grams of o-xylene and 23 grams of aluminum trichloride were added with stirring 25 grams of di-t-butylperoxide over a two hour period while keeping the temperature at −4 to +12° C. The reaction mixture was stirred for an additional hour at 5° C. The product was then extracted once with 100 mls. of benzene and finally with 200 mls. of benzene. The combined organic layers were washed with three 100 mls. portions of aqueous 5 wt. percent sodium hydroxide and once with 100 mls. of water. The combined aqueous washings were brought to a pH of 3 with concentrated hydrochloric acid, and extracted with three 100 mls. portions of benzene. The combined benzene extracts were dried over 5 grams of anhydrous sodium sulfate and stripped to a pot temperature of 125° C. to leave 5.2 grams of residue. Gas chromatographic analysis of this residue showed it to contain a mixture of monohydroxy-1,2-dimethylbenzenes.

EXAMPLE VIII

The procedure of Example I was essentially repeated except aluminum trichloride was deleted therefrom. There was no evidence of reaction and no phenol was found in the product.

I claim:

1. A method of preparing a phenolic compound of the formula:

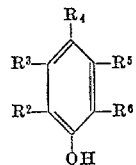

where $R^2$, $R^3$, $R^4$, $R^5$ and $R^6$ are selected from the group consisting of hydrogen and methyl comprising contacting an aromatic hydrocarbon of the formula:

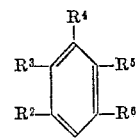

where $R^2$, $R^3$, $R^4$, $R^5$, and $R^6$ are as heretofore defined with a peroxide selected from the group consisting of hydrogen peroxide, ROOR′ and ROOH where R and R′ are alkyl radicals from 1 to 20 carbons in the presence of aluminum chloride at a temperature between about −50 and 50° C. in a mole ratio of said aromatic hydrocarbon to said peroxide of between about 100:1 to 1:5 and wherein said aluminum chloride is present in a molar ratio to peroxide of between about 10:1 and 0.1:1.

2. A method in accordance with claim 1 wherein said phenolic compound is phenol, said aromatic hydrocarbon is benzene and said peroxide is hydrogen peroxide.

3. A method in accordance with claim 1 wherein said phenolic compound is 2,4,6-trimethylphenol, said aromatic hydrocarbon is mesitylene and said peroxide is hydrogen peroxide.

4. A method in accordance with claim 1 wherein said phenolic compound is a monohydroxy-1,2-dimethylbenzene, said aromatic hydrocarbon is o-xylene and said peroxide is hydrogen peroxide.

5. A method in accordance with claim 1 wherein said phenolic compound is phenol, said aromatic hydrocarbon is benzene and said peroxide is di-t-butylperoxide.

6. A method in accordance with claim 1 wherein said phenolic compound is phenol, said aromatic hydrocarbon is benzene and said peroxide is t-butylhydroperoxide.

7. A method in accordance with claim 1 wherein said phenolic compound is 2,4,6-trimethylphenol, said aromatic hydrocarbon is mesitylene and said peroxide is di-t-butylperoxide.

8. A method in accordance with claim 1 wherein said phenolic compound is a monohydroxy-1,2-dimethylbenzene, said aromatic hydrocarbon is o-xylene and said peroxide is di-t-butylperoxide.

References Cited
FOREIGN PATENTS 723,454  2/1955  Great Britain.

OTHER REFERENCES

McClure et al.: Hydrogen Peroxide-Boron Trifluoride Etherate, a New Oxidizing Agent. J. Org. Chem. 27: pp. 24–26, 1962.

LEON ZITVER, *Primary Examiner.*

H. ROBERTS, *Assistant Examiner.*